(12) United States Patent
Meister et al.

(10) Patent No.: US 6,211,639 B1
(45) Date of Patent: *Apr. 3, 2001

(54) DRIVE SYSTEM USING A SERVOMOTOR WITH A MEMORY

(75) Inventors: Werner Meister, Reichelsheim; Rupert Weber, Schneeberg; Gabriele Pfeiffer, Darmstadt; Ralph Kennel, Erbach; Stefan Melzer, Hoechst; Alfred Punzet, Erbach; Ralf Dickhaut, Mossautal; Siegfried Melzer, Hoechst; Thomas Kost, Nieder-Roden, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,089

(22) Filed: Aug. 7, 1998

(30) Foreign Application Priority Data

Aug. 8, 1997 (DE) .............................................. 197 34 342
Jul. 16, 1998 (DE) .............................................. 198 31 931

(51) Int. Cl.⁷ .............................. G05B 19/04; G05B 19/23
(52) U.S. Cl. .................................. 318/568.2; 318/568.19; 318/574; 318/625
(58) Field of Search ........................... 318/560–568.25, 318/574, 625

(56) References Cited

U.S. PATENT DOCUMENTS

| | | | |
|---|---|---|---|
| 4,289,997 | * | 9/1981 | Jung et al. ............................ 318/113 |
| 4,672,279 | * | 6/1987 | Hosokawa et al. ............... 318/568.2 |
| 4,931,712 | * | 6/1990 | DiGiulio et al. ..................... 318/625 |
| 4,990,839 | * | 2/1991 | Schonlau .................... 318/568.15 X |
| 5,268,898 | * | 12/1993 | Kazato ............................. 318/562 X |

FOREIGN PATENT DOCUMENTS

| | | |
|---|---|---|
| 37 44 733 | 2/1989 | (DE) . |
| 0 155 403 | 9/1985 | (EP) . |
| 0 332 607 | 9/1989 | (EP) . |
| 0 446 733 | 9/1991 | (EP) . |
| 0 304 574 | 9/1992 | (EP) . |
| 0 572 149 | 12/1993 | (EP) . |
| 44 40 127 | 5/1996 | (EP) . |

\* cited by examiner

*Primary Examiner*—Brian Sircus
(74) *Attorney, Agent, or Firm*—Kenyon & Kenyon

(57) ABSTRACT

A drive device regulates a servomotor to one of a predefined position, a predefined speed, and a predefined current setpoint value. A control module is connected upstream from the drive device. A non-volatile memory where motor-specific data is stored is arranged in the housing of the servomotor. The housing has a data output through which the motor-specific data can be read. The motor-specific data is transmitted over a data line over which the feedback signals delivered by a sensor associated with the motor are also transmitted.

23 Claims, 1 Drawing Sheet

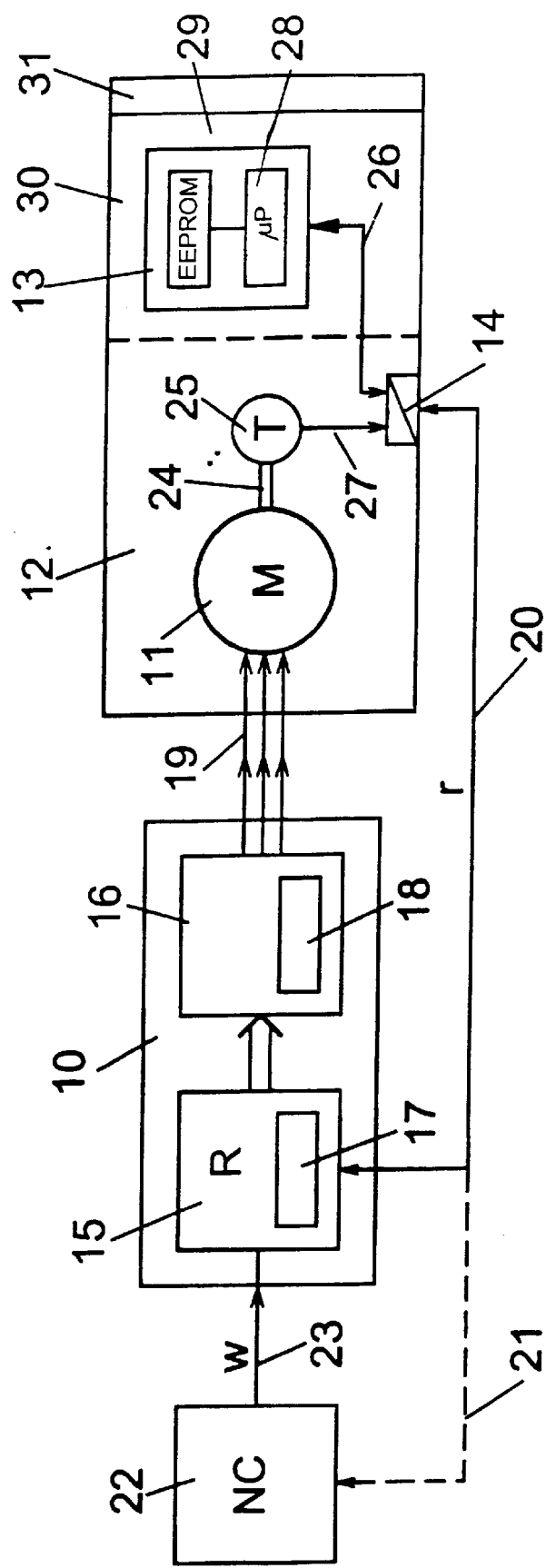

DRIVE SYSTEM USING A SERVOMOTOR WITH A MEMORY

FIELD OF THE INVENTION

The present invention relates to a drive device for use with a servomotor and a control module.

BACKGROUND INFORMATION

European Patent No. 446 733 B1 describes a known drive device used in conjunction with a servomotor, an upstream current control device, and a speed and position control device in cascade. The current control device includes a memory, where data for identifying the current amplifier used, as well as motor characteristics, are stored. The data in the current control device can be communicated to a higher-level control device via a communication device. The concept is convenient when current control devices and servomotor are permanently associated. The concept is less suitable when current control devices are often associated with other motors. In that case, the motor characteristics stored in the memory of the current control device must be adjusted every time.

German Patent No. 37 44 733 C2 describes a current control device with electric tools of different kinds that can be connected to the control device. Tool-specific codes are stored in a digital memory. When the connector is inserted in the socket, the data forming the codes is entered in the electronic control device serially via the data transmission lines and the I/O circuit. Limit values for parameters such as rotation speed, temperature, torque, electric current, voltage, and the like can be defined using these codes.

Furthermore, built-in encoders for servomotors (identified as Heidenhain, FRN/ECN/EQN 1300 Series) are known, which allow motor characteristics to be entered and, upon request, output via a synchronous serial data interface. Motors with such encoders can be conveniently connected to any kind of control. However, if the encoder has to be replaced, the replacement encoder must be reprogrammed, for which one must know both encoder programming and the motor characteristics. Neither is guaranteed in practice. Therefore, the storage options for motor characteristics are limited to certain intelligent incremental encoders. Encoders of simpler design, e.g., magnetic systems with ring-gear encoders, basically do not provide such an option, although it is possible to retrofit them to do so, but this would entail additional costs.

SUMMARY OF THE INVENTION

An object of the present invention is to provide a drive device that can be combined with any type of control device and is independent of the encoder type selected.

In the drive device of the present invention, motor characteristics are stored permanently in a data memory located in the motor housing. Consequently, the motor can be easily integrated into any control configuration even by users unfamiliar with the motor technology. In particular, the motor current supply with the respective current regulation can be automatically adjusted to a motor after reading the motor characteristics. It is advantageous that a microprocessor or an application-specific integrated circuit (ASIC) to control access to the motor data be associated with the memory where the motor characteristics are stored. The motor-specific data stored in the non-volatile memory is sent to the control module via a data output. The signal of a sensor associated with the motor is sent to the control module via the same data output and the respective data line. The terminal already present for this application is also used for transmitting the motor-specific data according to the present invention. For this purpose, locating the non-volatile memory in the servomotor housing offers advantages due to the simple data link.

BRIEF DESCRIPTION OF THE DRAWING

The FIGURE shows a block diagram representing a drive device according to the present invention.

DETAILED DESCRIPTION

The FIGURE shows a drive configuration as is typical in machine tool applications. The drive configuration features a higher-level numeric control 22, which provides a control module 10 with a position, speed, or current setpoint value w via a data link 23. In control module 10, setpoint value w goes to a control unit 15, which also receives feedback signal r representing the actual position, the actual speed, or the actual current. According to the difference between setpoint w and feedback signal r, control unit 15 controls a current converter 16 to generate a motor current. The motor current is transmitted, via lines 19, to a servomotor 11 driving a shaft 24 according to the received current. The position and/or speed of shaft 24 is detected by a sensor 25 and converted into a measured value, which appears at a data output 14. From there the measured value is fed back via a line 20 as feedback signal r to control unit 15 in control module 10. Sensor 25 can be either an intelligent incremental encoder with signal pre-evaluation or a simple magnetic system. As an alternative to position and/or speed detection, the current applied to motor 11 can also be detected; this alternative, however, is not illustrated for the sake of clarity. Servomotor 11, sensor 25, and data output 14 are located in a common housing 12, which is usually located separately from control module 10. Feedback signal r can also be supplied to higher-level numeric control 22 via an extension 21 of line 20, in addition to being supplied to control unit 15. In this case, part of the motor current control may also take place in the higher-level control 22; control module 10 can then have a simpler design or be omitted altogether.

A non-volatile memory 13, designed as an EEPROM, for example, is also located in motor housing 12. Memory 13 can be read or written via data link 26, running through data output 14. Drive-specific data is stored in electronic memory 13. When connected to control module 10 and/or when the arrangement is used for the first time, the data in memory 13 is read by control module 10. Then control unit 15 and/or converter 16 are configured according to the data. The motor characteristics stored in memory 13 can also be supplied to higher-level control 22, for adjustment of the setpoint value. The control parameters for control unit 15 are also stored in non-volatile memory 13. The control parameters can be either values for the proportional component, the integral component, or the differential component of a suitable controller. Drive-specific limit values, such as the maximum allowable rotation speed, maximum allowable current, etc. and the type of the drive (synchronous motor or asynchronous motor), information that is required for starting servomotor 11, are also permanently stored in non-volatile memory 13. Depending on the stored type of servomotor 11, control module 10 runs through different control program sections. The typical characteristic curve of the selected servomotor 11, describing the relationship between torque and rotation speed, for example, is also located in non-volatile memory 13 as information.

Sensor 25 is provided to acquire the data of servomotor 11 that are required for control or monitoring. Sensor 25 can measure, for example, the current, temperature, position, or rotation speed of servomotor 11. Depending on the sensor used as sensor 25, a characteristic curve of this sensor 25 is stored in non-volatile memory 13. For example, if an NTC temperature sensor 25 is used, a parameter set is stored in non-volatile memory 13, which describes the exponential function of the characteristic curve.

For each restart of servomotor 11, the data stored in non-volatile memory 13 is read via data link 26, data output 14, and data line 20, and supplied to control unit 15 in an initialization step. During ongoing operation, data line 20 is used for communication between sensor 25 and control unit 15. Data line 20 is a cable, and feedback signal r of sensor 25, for example, the rotation speed of servomotor 11, is transmitted to control unit 15 in real time operation. In regular operation, control unit 15 can also receive status signals of sensor 25, which describe the operability of sensor 25. In principle, data line 20 may also be formed by two cables, with feedback signal r of sensor 25 being transmitted in the first one, and the status signals of sensor 25 and the data of non-volatile memory 13 being transmitted in the second one. The second cable allows bidirectional data exchange between control module 10 and an electronic peripheral 28, which may also be referred to as an intelligent data processing device.

For example, if control parameters have to be modified directly in control module 10 to optimize control unit 15 when servomotor 11 is put in service, this data can be written into non-volatile memory 13, so that this data is available for the next start of servomotor 11 as updated parameters.

In other alternative embodiments of the present invention, process-specific data can also be stored in a non-volatile manner in non-volatile memory 13. This data may include, for example, a process rotation speed not to be exceeded, which is less than the maximum possible rotation speed.

The motor characteristics stored in memory 13 are transmitted over a data link, which may have the design of a data bus. The data can then be read by all the stations connected to the bus. Physically the data link is conveniently implemented via data line 20, which is already present for conducting feedback signals r emitted by sensor 25.

In order to manage data access to memory 13, memory 13 advantageously is associated with a peripheral that may contain a microprocessor or an application-specific integrated circuit (ASIC). Memory 13 and electronic peripheral 28, which manages memory 13, are preferably mounted on a common board 29, which is arranged at an easily accessible location of motor housing 12. For example, board 29 can be located on the motor housing face opposite the shaft exit in a bowl-shaped recess 30, which is produced by extending the longitudinal side of motor housing 12 beyond the rotor area. The open side is closed using a cap 31. Board 29 can be accessed at any time by removing cap 31 as needed.

Access to memory 13 can, of course, also be direct without requiring electronic peripheral 28.

To improve system flexibility, control unit 15 and/or converter 16 in control module 10 advantageously have one memory device 17, 18 each, where characteristics of the device are stored. When the drive device is put in service, these characteristics can be communicated to other elements via data line 20. All elements of the arrangement can thus be optimized to one another.

In keeping with the basic idea of providing an electronic memory 13 in servomotor 11, where its characteristics are permanently stored, a plurality of variations of the embodiment are conceivable. This is particularly true for the implementation of memory 13. Thus, data can also be stored optically, or memory 13 can be arranged in motor housing 12 in some other manner. Instead of a single data output 14, through which both the data stored in memory 13 and the measured values reported by sensor 25 are transmitted, several data outputs can also be provided.

The present invention is not limited to the application with a servomotor 11. Other known actuators can be used.

What is claimed is:

1. A drive device for regulating a servomotor to one of a predefined position, a predefined speed, and a predefined current setpoint value, comprising:

a housing for the servomotor the housing having a data output;

a sensor coupled to the servomotor and providing data of an actual state of the servomotor to the data output;

a control module coupled upstream from the servomotor and supplying a current, which is controlled by the control module, to the servomotor, wherein at least one of motor-specific data and the data of an actual state of the servomotor provided by the sensor is used to configure a regulating and control device of the control module;

a memory arranged in the housing and storing at least the motor-specific data of the servomotor that is used to configure the regulating and control device, the motor-specific data being read out from the data output; and a data line coupled to the control module and to the data output, at least one of the motor-specific data and the data of the actual state of the servomotor being transmittable on the data line, and a plurality of feedback signals provided by the sensor being conducted on the data line to the control module.

2. The drive device according to claim 1, wherein a servomotor current supply in the control module is automatically adjustable to the servomotor after the control module receives the motor-specific data, which defines at least one operating characteristic of the servomotor.

3. The drive device according to claim 1, wherein the control module includes a second memory coupled to the data line and storing data specific to the control module.

4. The drive device according to claim 1, wherein the memory is arranged in a recess of the housing.

5. The drive device according to claim 1, further comprising an intelligent data processing device coupled to the memory and managing at least one of a position regulation function and a rotation regulation function of the memory.

6. The drive device according to claim 1, wherein at least one of the motor-specific data and the data of the actual state of the servomotor is written into the memory via the data output.

7. The drive device according to claim 1, wherein the memory includes an EEPROM.

8. The drive device according to claim 1, wherein the plurality of feedback signals include the data of the actual state of the servomotor.

9. The drive device according to claim 1, wherein the plurality of feedback signals include a signal describing a state of the sensor.

10. The drive device of claim 1, wherein the motor-specific data includes at least one of a drive-specific limit value, a motor class parameter, motor starting information, and at least one characteristic curve relating two motor operating parameters.

11. The drive device of claim 10, wherein the motor-specific data includes the drive-specific limit value, the drive-specific limit value including at least one of a maximum rotation speed and a maximum allowable current.

12. The drive device of claim 10, wherein the motor-specific data includes the motor class parameter, the motor class parameter indicating whether the motor is one of a synchronous class motor and an asynchronous class motor.

13. The drive device of claim 10, wherein the motor-specific data includes the at least one characteristic curve, the at least one characteristic curve defining a relationship between a motor torque parameter and a motor speed parameter.

14. A servomotor system for use in a drive system, comprising:

a servomotor;

a sensor, coupled to the servomotor, that senses and outputs actual state data of the servomotor;

a memory system for storing motor-specific data, which defines at least one operating characteristic of the servomotor for use in automatically adjusting a regulating and control unit of a control module that controls the servomotor based on the motor-specific data, and the actual state data of the servomotor;

a data terminal coupled to the sensor so as to receive the actual state data, and further coupled to the memory system so as to allow communication of at least one of the motor-specific data and the actual state data of the servomotor to the control module via a data line wherein a plurality of feedback signals provided by the sensor are conducted via the data terminal and the data line to the control module; and a housing for housing the servomotor, the sensor, the memory system and the data terminal.

15. The servomotor system of claim 14, wherein the data terminal allows communication of the motor-specific data and the actual state data.

16. A drive system comprising:

a motor;

a control module, in which motor-specific data of the motor is used to configure a regulating and control device of the control module, that is coupled to the motor and that supplies drive current to the motor;

a sensor, coupled to the motor, that senses and outputs actual state data of the motor;

a memory system for storing the motor-specific data and the actual state data of the motor;

a data terminal coupled to the sensor and to the memory system;

a housing that houses the motor, the sensor, the memory system and the data terminal; and a data line, coupled to the control module and to the data terminal, at least one of the motor-specific data and the actual state data of the motor being communicated on the data line to the control module, wherein a plurality of feedback signals provided by the sensor are conducted via the data terminal and the data line to the control module.

17. The drive system of claim 16, wherein the motor-specific data and the actual state data are communicated on the data line.

18. A drive system comprising:

means for controlling a motor and for supplying drive current to the motor, wherein the means for controlling includes a means for regulating and controlling that is configured based on motor-specific data;

a motor that is coupled to and receives the drive current from the means for controlling;

means for sensing actual state data of the motor;

means for storing at least the motor-specific data;

means for transmitting data, the means for transmitting being coupled to the means for sensing and to the means for storing;

a housing that houses the motor, the means for sensing, the means for storing and the means for transmitting; and means for communicating at least one of the motor-specific data, which is used to configure the means for regulating and controlling of the means for controlling the motor, and the actual state data between the means for controlling and the means for transmitting, the means for communicating being coupled between the means for controlling and the means for transmitting.

19. The drive system of claim 18, wherein the motor-specific data and the actual state data are communicated by the means for communicating.

20. The drive device of claim 18, wherein the motor-specific data includes at least one of a drive-specific limit value, a motor class parameter, motor starting information, and at least one characteristic curve relating two motor operating parameters.

21. The drive device of claim 20, wherein the motor-specific data includes the drive-specific limit value, the drive-specific limit value including at least one of a maximum rotation speed and a maximum allowable current.

22. The drive device of claim 20, wherein the motor-specific data includes the motor class parameter, the motor class parameter indicating whether the motor is one of a synchronous class motor and an asynchronous class motor.

23. The drive device of claim 20, wherein the motor-specific data includes the at least one characteristic curve, the at least one characteristic curve defining a relationship between a motor torque parameter and a motor speed parameter.

* * * * *